Figure 1:
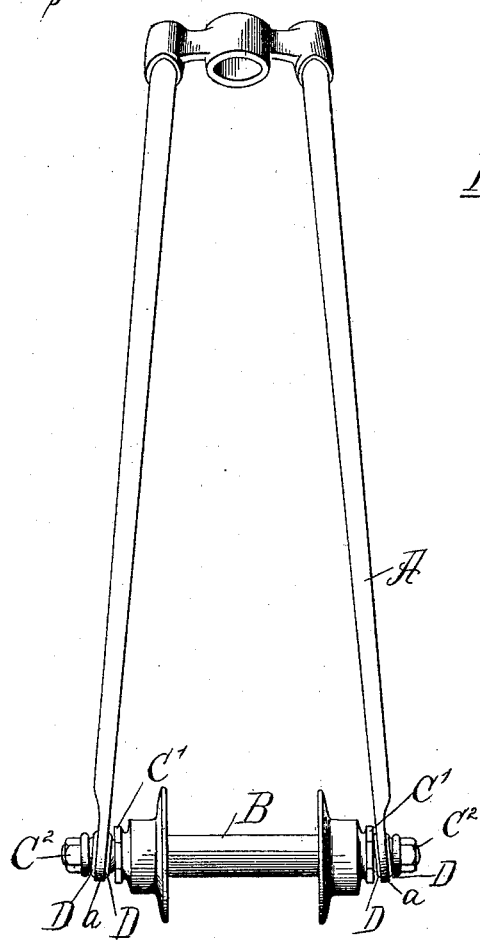

No. 631,018. Patented Aug. 15, 1899.
A. LEVEDAHL.
ATTACHING DEVICE FOR VEHICLE AXLES.
(Application filed July 22, 1895.)

(No Model.)

Witnesses
Clinton Hamlink
William L. Hall

Inventor
Axel Levedahl by Dayton, Poole & Brown
his Attorneys

UNITED STATES PATENT OFFICE.

AXEL LEVEDAHL, OF CHICAGO, ILLINOIS, ASSIGNOR TO THE AURORA AUTOMATIC MACHINERY COMPANY, OF AURORA, ILLINOIS.

ATTACHING DEVICE FOR VEHICLE-AXLES.

SPECIFICATION forming part of Letters Patent No. 631,018, dated August 15, 1899.

Application filed July 22, 1895. Serial No. 556,720. (No model.)

*To all whom it may concern:*

Be it known that I, AXEL LEVEDAHL, of Chicago, in the county of Cook and State of Illinois, have invented certain new and useful Improvements in Attaching Devices for Vehicle-Axles; and I do hereby declare that the following is a full, clear, and exact description thereof, reference being had to the accompanying drawings, and to the letters of reference marked thereon, which form a part of this specification.

This invention relates to improvements in the means for securing the bearing axles or shafts of bicycles and other velocipedes to the forks thereof; and the invention consists in the matters herein set forth, and particularly pointed out in the appended claims.

In the present state of the art it is customary to fasten the axles to the forks by clamping the ends of the latter between the external bearing surfaces or shoulders of the axle and the clamping-nuts which are provided at the extremities thereof. The opposing shoulders of said cones and clamping-nuts ordinarily stand at right angles to the axle, and as a consequence the tightening of the clamping-nuts against the fork ends tends to force the latter into a position also at right angles to the axle. Both the front and rear forks of a bicycle as ordinarily constructed diverge from their juncture toward their extremities, and it seldom happens that workmen making the frame so form or bend the extremities of the forks that they will stand in exact parallel relation to each other and at right angles to the line of the axle when the latter is secured thereto. Obviously, therefore, the action of the clamping-nuts tends to force the fork ends into said right-angular relation to the axle, but the forks being relatively stiff and tending constantly to return to their original angular relation a strain is brought on the axle, tending to bend the same. Such bending of the axle will obviously result in the parts of the roller-bearings being thrown out of proper operative relation, and consequently in unequal wear and friction on the parts of the bearings. In my present improvement I provide for the clamping of the forks between opposing shoulders which are not held in fixed angular relation to the axle, but are free to adjust themselves with relation thereto to accommodate any angles at which the fork ends may stand. To this end I have provided, in connection with the fork end or part of the frame to which the axle is clamped and the axle having parts, such as the axle-shoulder and clamping-nut, between which the frame is clamped, a pair of washers which are interposed between said fork end or frame part and the said parts aforesaid between which the frame is clamped, and I make the engaging faces of the washers and the parts aforesaid spherical and complemental to each other, whereby the axle and washers may adjust themselves to the exact angle of the fork end or frame part without lessening the security and rigidity of the attachment between the frame and axle.

My invention may be better understood by reference to the accompanying drawings, in which—

Figure 2:
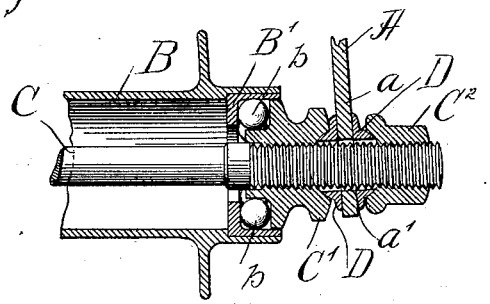
Figure 3:
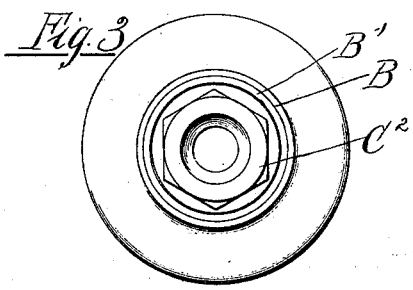
Figure 4:
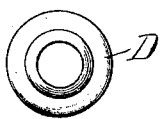
Figure 5:
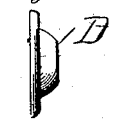

Figure 1 is a front view of the front forks of a "safety-bicycle" with the axle or shaft and the hub of the front wheel in place between the lower ends of the forks. Fig. 2 is an enlarged sectional detail showing the method of securing the axle to the forks. Fig. 3 is an end view of the hub of the wheel. Fig. 4 is a similar view of one of the washers. Fig. 5 is a side view of one of the washers.

In said drawings, A designates the bicycle-forks, B the hub of the wheel-support thereon, and C the axle or shaft, which extends between the extremities of the forks and passes through the hub of the wheel to afford a journal therefor. The ends of the axle C are shown as screw-threaded in the usual manner to receive adjustable annular bearing members or rings C', between which and annular bearing-sleeves B' in the ends of the hub antifriction-balls $b$ are inserted. The exact construction of the bearing thus referred to has, however, no relation to my present improvement, and it may be of any pattern desired. The outer ends of the rings C' C' in this instance constitute the shoulders or annular bearing-surfaces of the axle, between which and the clamping-nuts $C^2$ $C^2$ on the outer ends of the axle the fork ends are secured or clamped. The ends $a$ of the forks A are provided with a slot or aperture $a'$, made large enough to loosely receive the ends of the shaft C, and are clamped thereon by the nuts $C^2$, which latter are applied on the extremities of the shaft in the usual manner.

In my present improvement the sides of the fork ends $a$ are not engaged directly by the rings C and nuts $C^2$, between which they are clamped; but washers D are inserted between the same at both sides of the fork ends. Said washers are made flat on their inner sides or those which are in contact with the fork ends, but on their opposite or outer sides are made of convex shape to engage corresponding concavities in the faces of the rings $C'$ and nuts $C^2$. Said concave and convex surfaces are made substantially spherical in form, and are consequently adapted to firmly engage each other throughout their full area of contact when placed either at right angles to the axle or in angular relation to the latter. With this construction the washers adjust themselves to the angularity of the fork ends, so that the tightening of the nuts $C^2$ will have no tendency to spring, bend, or put under tension either the axle or the forks. In other words, if the ends of the forks do not stand at a perfect right angle with the axle the washers D will turn in their cup-shaped bearings against the rings and nuts until their flat faces lie parallel to and in close contact with the adjacent faces of the forks, and the nuts when tightened will hold the parts firmly without bringing any strain whatever on the axle of a kind tending to bend the same. Any bending of the axle will obviously result in throwing unequal strain on the parts of the ball-bearings, with the result of preventing their proper action.

The contact-surfaces of the washers and the parts in contact therewith are preferably made accurately spherical in form, so that the area of contact of the washers with the rings and nuts will be the same notwithstanding the angular position of the washers. By this construction, moreover, the rigidity of the connection between the forks and axle will be the same as though flat washers were used, owing to the fact that the opposing convex and concave parts will be in solid bearing against each other, and the connection will be equally strong and rigid whether the forks stand at a perfect right angle to the axle or not. Moreover, it is not even necessary that the opposite faces of each fork end should be parallel with each other, since the washers at each side thereof are free to turn or twist independently of each other to accommodate the different angles of said faces.

The advantages of the improved form of connection thus described are particularly noticeable in the case of low-priced machines, in which the frames are made with little care and in which the angular divergence of the forks is often very marked and the tendency to bend the axle and distort the bearing correspondingly great. Its advantages are also apparent in high-grade machines, which although more carefully finished are made with lighter parts to decrease their weight, and are consequently less able to stand any undue strain without noticeable distortion. It will also be obvious that while herein illustrated as applied to the front forks and axle the improvement is equally applicable for connecting the rear forks and axle and is likely to be even more necessary in the latter case, since the rear forks ordinarily consist of two converging bars on each side instead of one, and are consequently stiffer and more liable to throw an excessive or harmful bending strain on the shaft.

I claim—

1. The combination with a frame, an axle, and parts on the axle between which the frame is clamped, of a pair of washers disposed upon opposite sides of the clamped portion of the frame and engaged by the parts aforesaid between which the frame is clamped, the engaging faces of the washers and the parts aforesaid being spherical and complementary to each other, substantially as described.

2. The combination with a wheel-axle and a frame which is secured to the axle by being clamped between annular bearing-surfaces or shoulders on said axle, washers inserted between the said frame and the bearing surfaces or shoulders of the axle, said washers having flat faces in contact with the frame and convex surfaces in contact with the shoulders and said shoulders being provided with concave contact-surfaces, substantially as described.

3. The combination with the forks of a bicycle of an axle provided at each end with outwardly-facing concave shoulders, clamping-nuts between which and the said shoulders the fork ends are clamped, said nuts having concave contact-faces and washers inserted between the fork ends and the shoulders and nuts, said washers being provided with flat faces in contact with the fork ends and convex contact-surfaces for engagement with the axle and nuts, substantially as described.

4. The combination with the forks and axle of a bicycle of a wheel-hub mounted on the axle, ball-bearings, the inner members of which are formed by rings mounted on the axle and having concave external faces, clamping-nuts between which and said rings the fork ends are clamped, said nuts having concave inner faces and washers inserted between the fork ends and the said rings and nuts, said washers being provided with flat faces in contact with the fork ends and with external convex surfaces engaging the concave surfaces of the rings and nuts, substantially as described.

In testimony that I claim the foregoing as my invention I affix my signature in presence of two witnesses.

AXEL LEVEDAHL.

Witnesses:
C. CLARENCE POOLE,
ALBERT H. GRAVES.